Patented Dec. 17, 1929

1,739,736

UNITED STATES PATENT OFFICE

JOHN H. SACHS, OF WILMINGTON, DELAWARE, ASSIGNOR TO E. I. DU PONT DE NEMOURS & COMPANY, OF WILMINGTON, DELAWARE, A CORPORATION OF DELAWARE

PRODUCTION OF CHLORO DERIVATIVES OF N-DIHYDRO-1,2.2',1'-ANTHRAQUINONE-AZINE

No Drawing. Application filed July 29, 1925. Serial No. 46,882.

This invention relates to a process of producing chloro-derivatives of N-dihydro-1,2,2',1'-anthraquinone-azine, and in general comprises subjecting said anthraquinone-azine preferably while suspended in sulfuric acid to the action of nitric and hydrochloric acids freshly formed in the reaction mixture.

The chief object of my invention is to provide a more easily controlled method of chlorinating the anthraquinone-azine than that heretofore known. Various other objects and advantages of my invention however will be apparent from the following specification.

I have discovered that if N-dihydro-1,2,2',1'-anthraquinone-azine, in a fine state of subdivision, is suspended in sulfuric acid of, for example, 50 to 55% strength, to which the required amount of sodium nitrate has been added, and the mixture heated to a moderate temperature—say, 45 to 50° C.—an easily controlled chlorination of the azine may be obtained by the gradual addition of sodium chloride. By this procedure, the anthraquinone-azine is subjected to the action of nitric and hydrochloric acids formed in the reaction mixture, the resulting oxidation and chlorination occuring, at least to some extent, concurrently.

The invention may be illustrated in greater detail by the following examples, although, as will be understood, the invention is not limited to the particular conditions specified therein:

1. 10 parts of finely ground N-dihydro-1,2,2',1'-anthraquinone-azine are added slowly and with stirring to 120 parts of 52% sulfuric acid to which has been added at ordinary temperature 10 parts of dry sodium nitrate. The temperature of the mass is raised to 45° C. and at this point 20 parts of salt (NaCl) are added over a period of 3 hours. After one more hour the mass is drowned in water and filtered. The product after being washed salt- and acid-free, and then dried, contains from 5 to 6% of chlorine.

2. 10 parts of N-dihydro-1,2,2',1'-anthraquinone-azine, in the form of a paste containing 25% solids, are run slowly and with stirring into 80 parts of 78% sulfuric acid to which has been added at ordinary temperatures 10 parts of dry sodium nitrate. The mixture is further diluted with 10 parts of water and then at a temperature of 45-50° C., 30 parts of salt (sodium chloride) are added over a period of four hours. The mass is allowed to agitate for another two hours after which it is drowned in water and filtered. The product after being washed salt- and acid-free, and then dried, contains from 9 to 10% of chlorine.

The reaction by which chlorine is introduced into the molecule by the method described above, proceeds in two stages. The first stage is the oxidation of N-dihydro-1,2,2',1'-anthraquinone-azine to 1,2,2',1'-anthraquinone-azine. In the second stage the latter compound, just as do other azines, adds hydrogen chloride, with the formation of mono-chlor-N-dihydro-1,2,2',1'-anthraquinone-azine. It will, of course, be understood that occasionally by reason of the simultaneous presence of hydrochloric and nitric acids in the reaction mixture a strongly oxidizing solution is obtained, as the result of which the chlorinated derivative of the N-dihydro-1,2,2',1'-anthraquinone-azine is oxidized to the corresponding chlorinated derivative of 1,2,2',1'-anthraquinone-azine. Where the chlorination of the N-dihydro-1,2,2',1'-anthraquinone-azine takes place with the formation of the resulting oxidized compound, it is easily possible to obtain the reduced compound, i. e. chlorinated N-dihydro-1,2,2',1'-anthraquinone-azine by a simple treatment of the oxidized compound with any well known reducing agent. By the oxidation of the mono-chlor-compound and subsequent addition of hydrogen chloride, the dichloro-compound may be produced.

The graphical chemical formulas of the products taking part in this process are probably as follows:

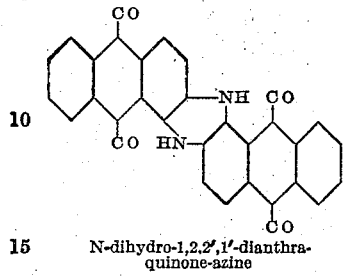
N-dihydro-1,2,2',1'-dianthraquinone-azine

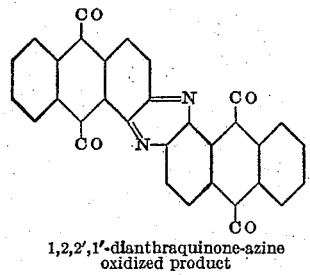
1,2,2',1'-dianthraquinone-azine oxidized product

The position of the chlorine atoms in the chlorinated product is not definitely known, but it is believed that in the mono-chloro compound the chlorine is in the position designated by (a) in the following formula, and that in the dichloro derivative the chlorine occupies the positions designated by (a) and (b):

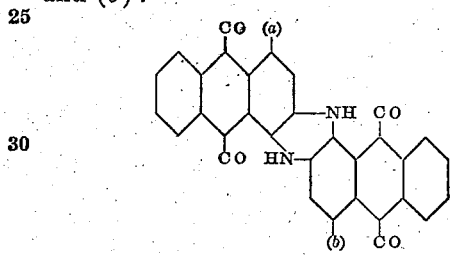

This new procedure entails many advantages especially when the process is practiced on a large, or plant, scale. Thus, the handling of hydrochloric and nitric acids in carboys is done away with, the cost of the materials required to chlorinate is reduced by about 40%, the cooling of the mixed acids is eliminated, and finally the process as carried out permits of an easy control in the amount of chlorine introduced into the anthraquinone-azine in that this factor can be varied by the rate of addition of the salt.

Suitable changes may be made in details of operation and substances used for carrying out the process, without departing from the spirit and scope of the invention.

I claim:

1. The process of chlorinating N-dihydro-1,2,2',1'-anthraquinone-azine which comprises suspending said anthraquinone-azine in sulphuric acid containing nitric acid, and subjecting the suspended azine to the action of hydrogen chloride formed in the reaction mixture.

2. The process which comprises adding a metal nitrate to sulphuric acid of more than 45% strength, mixing therewith finely divided N-dihydro-1,2,2',1'-anthraquinone-azine, heating the mixture to a temperature of from about 45 to 50° C., and adding a metal chloride to form hydrogen chloride which will combine with the oxidized azine present.

3. The process which comprises mixing N-dihydro-1,2,2',1'-anthraquinone-azine and an alkali-metal nitrate with sulphuric acid, maintaining the temperature of the mixture at about 45–50° C. while gradually adding sufficient alkali-metal chloride to effect chlorination of the azine, and then when the reaction has proceeded to the desired extent, drowning the mass in water.

4. The process which comprises mixing N-dihydro-1,2,2',1'-anthraquinone-azine and an alkali-metal nitrate with sulphuric acid, and maintaining the temperature of the mixture at about 45–50° C. while gradually adding sufficient alkali-metal chloride to effect chlorination of the azine.

5. The process of producing chloro-derivatives of N-dihydro-1,2,2',1'-anthraquinone-azine which comprises subjecting an oxidized N-dihydro-1,2,2',1'-anthraquinone-azine to the action of hydrogen chlorine formed in the reaction mixture in the presence of sulphuric acid.

6. The process which comprises mixing 10 parts of N-dihydro-1,2,2',1'-anthraquinone-azine and about 10 parts of sodium nitrate with sulphuric acid of moderate strength, heating the mixture to a temperature a little above normal room temperature and then gradually adding from about 20 to 30 parts of sodium chloride over a period of several hours to form a chloro-derivative of N-dihydro-1,2,2',1'-anthraquinone-azine.

7. The process which comprises mixing 10 parts of N-dihydro-1,2,2',1'-anthraquinone-azine and about 10 parts of sodium nitrate with sulphuric acid of from between 45 and 80% strength, heating the mixture to a temperature of about 45° C., and gradually adding sufficient chloride to said mixture, while maintained at said temperature, to effect the desired degree of chlorination of the anthraquinone-azine.

8. The process of producing coloring matters, which comprises treating an anthraquinonazine with a halide in the presence of sulfuric acid.

9. The process of producing coloring matters, which comprises treating an anthraquinonazine with sodium halide in the presence of sulfuric acid.

10. The process of producing coloring matters, which comprises treating an anthraquinon-azine with a chloride in the presence of sulfuric acid.

11. The process of producing a chlorinated derivative of N-dihydro-1,2,2',1'-anthraquinone-azine, which comprises inducing a reaction between an anthraquinone-azine and hydrogen chloride in presence of sulfuric acid.

12. The process of producing a chlorine derivative of 1,2,2',1'-anthraquinone-azine, which comprises oxidizing an indanthrene to its corresponding azine by means of a suitable oxidant in the presence of sulfuric acid and subsequently subjecting the azine thus produced, and while still in the presence of sulfuric acid, to the action of a chloride.

13. The process of producing a monochlor derivative of 1,2,2',1'-anthraquinone-azine, which comprises treating 1,2,2',1'-anthraquinone-azine in the presence of sulfuric acid with a chloride.

14. The process of producing a monochlor derivative of 1,2,2',1'-anthraquinone-azine, which comprises treating 1,2,2',1'-anthraquinone-azine with sodium chloride in the presence of sulfuric acid.

In testimony whereof I affix my signature.

JOHN H. SACHS.